No. 742,136. Patented October 20, 1903.

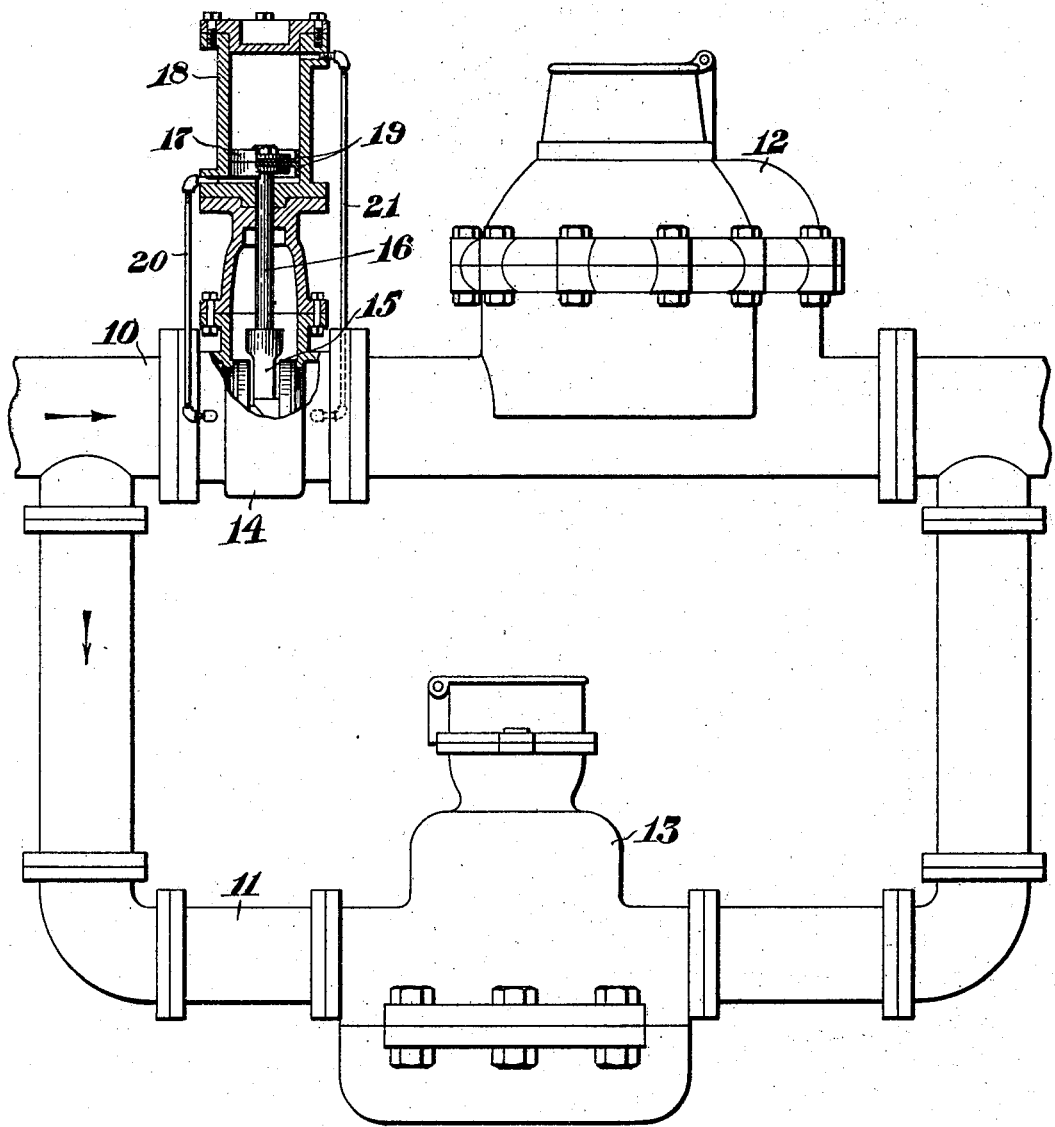

UNITED STATES PATENT OFFICE.

JAMES A. TILDEN, OF HYDEPARK, MASSACHUSETTS, ASSIGNOR TO HERSEY MANUFACTURING COMPANY, OF SOUTH BOSTON, MASSACHUSETTS, A CORPORATION OF MAINE.

FLUID-CONTROLLING MECHANISM.

SPECIFICATION forming part of Letters Patent No. 742,136, dated October 20, 1903.

Application filed April 13, 1903. Serial No. 152,300. (No model.)

*To all whom it may concern:*

Be it known that I, JAMES A. TILDEN, a citizen of the United States, residing at Hydepark, in the county of Norfolk and State of Massachusetts, have invented certain new and useful Improvements in Fluid-Controlling Mechanisms, of which the following is a specification.

My invention relates to means for controlling various conditions of a fluid in a conducting system; and it consists in the features hereinafter described and more particularly claimed.

The drawing shows one embodiment of my invention applied, in this particular instance, to the controlling of the distribution of water through a meter system.

The numeral 10 designates a main pipe or conduit, preferably of a diameter sufficient to properly supply the maximum amount of liquid which may be required at any time, and 11 a by-pass opening therefrom, which may be of a suitable size to supply the normal quantity of liquid which is to be drawn from the system. In the main conduit and by-pass may be included, respectively, meters 12 and 13, which are preferably of such form and size to efficiently measure the flow through them to insure accuracy of result and to avoid the introduction of undue resistance. In the main conduit between the openings of the by-pass is shown the more essential portion of my improved controlling mechanism. This, as illustrated, comprises a casing 14, inserted in and forming a part of the main conduit, in which casing operates the valve 15, conveniently of the reciprocating or "gate" type, from which projects the stem 16. To the valve-stem is connected actuating means therefor, which may consist of a piston or head 17, operating in a cylinder or chamber 18. The cylinder may be so secured to the valve-casing as to form a water-tight joint and the valve-stem pass from the casing into the cylinder through an opening, giving a close but freely-movable fit, the condition being such that packing about the valve-stem may be omitted. To prevent leakage in the cylinder by the piston, some suitable packing 19 is preferably applied to the edge thereof. Opening through the casing or other portion of the main conduit at one side of the valve and through the cylinder at or near one end is a comparatively small pipe or conduit 20, while a pipe or conduit 21 is similarly situated with respect to the opposite side of the valve and opposite end of the cylinder. The distance between the openings of these pipes 20 and 21 into the cylinder is preferably such that the movement of the piston between them will completely open or close the valve.

In the connection above described my improved controlling mechanism may be used as follows: A fluid—for example, water—being supplied under pressure to the main conduit, so that it will move therein in the direction of the arrow, and the valve 15 being closed, it will be seen that the piston is acted upon by three forces—the pressure of the fluid through the pipe 20 upon the under side of the piston, tending to raise it and open the valve; the pressure through the pipe 21 upon the upper side, tending to lower it and close the valve, and the weight of the moving parts of the valve, including the piston, also tending to close it. It is evident that under such conditions of use as may be termed "normal," when the by-pass is capable of conveying and the meter 13 of measuring without undue resistance the water allowed to flow through the conduit, the first two of these forces will approximately balance one another. Therefore the weight of the moving parts remains as a definite force, tending to keep the valve closed, and, within reasonable limits, this may be given any desired value, conveniently by varying the thickness of the piston, the closing force being made of such magnitude that the velocity of the current through the by-pass under normal conditions will not produce difference in pressure enough between the opposite sides of the valve to overcome it. Now suppose some extraordinary demand is made upon the system, as in case of the use of water for irrigation or the extinguishing of fires. The rate of flow will at once increase and the pressure along the conduit proportionately fall, and when the difference in pressure at the opposite sides of the valve, and therefore at the opposite sides of the piston, attains a definite maximum or is greater than the closing force exerted upon the valve the piston will be forced upward in the cylinder by the excess of pressure through the pipe 20 and the valve opened, permitting the flow through the main conduit and its measurement by the meter 12 without material loss of head. After the opening movement of the valve has been inaugurated it will continue until the difference in pressure between the opposite sides equals the closing force, at which time this balance of forces holds the valve in position. It is obvious that, within the capacity of the main conduit, however the rate of flow is augmented a fixed maximum difference in pressure between the opposite sides of the valve will be maintained, and therefore a definite rate of flow through the by-pass, since any tendency to increase this difference will at once result in an increase in area of the valve-opening and an equalization thereof. On the other hand, if the abnormal demand is decreased the weight of the moving parts, overcoming the excess of pressure upon the under side of the piston, proportionately closes the valve to still maintain the definite differential until when the rate of flow is sufficiently diminished the valve completely closes and the normal conditions are resumed. Throughout the entire operation the balance of forces is such that this regulation is smoothly effected and without "churning" of the piston. It should be noted that when the valve is moved from its position of full closure it may be acted upon by still another considerable force tending to resist the movement. This is the friction of the edges of the valve against the contacting portion of the casing, which will exert a force depending in magnitude upon the differential fluid-pressure between the opposite faces of the valve, the ratio between the exposed portion of the valve and the piston, and the nature and condition of the contacting-surfaces. By making the valve area the larger a force resisting initial opening is added to the weight of the moving parts, which is advantageous in that it prevents the starting the flow through the meter 12 upon a slight increase in pressure and the resulting dribbling therethrough of fluid in amounts too small to be properly measured. Nevertheless after the valve is once opened this force is substantially removed by the drop in the pressure, and the mechanism becomes equally sensitive to regulating movement in either direction. By making the piston area relatively the larger the effect of this frictional resistance may be reduced to any desired extent until it becomes practically negligible.

Though my invention has been described for convenience in disclosure as applied primarily to be a use which may be considered as an automatic switch for directing the flow of water it is evident that it is in no wise limited to such purpose or in connection with any particular liquid, but, on the contrary, is of general utility wherever it may be desired to automatically secure operation at or maintain a constant differential of pressure between portions of a system in which fluid is conducted under pressure.

Having thus described my invention, I claim—

1. The combination with a main conduit for conveying fluid under varying pressures, of a by-pass conduit opening therefrom, a meter in the system between the openings of said by-pass conduit, a valve in the system between the openings of the by-pass conduit for maintaining its conduit closed under pressures resulting in fluid flow properly measurable by the meter, and automatic means for opening the valve upon a definite variation in the pressure and then maintaining a fixed difference of pressure between the opposite sides of said valve.

2. The combination with a main conduit for conveying fluid under varying pressures, of a by-pass conduit opening therefrom, a meter in the by-pass conduit, a valve in the main conduit between the openings of the by-pass conduit maintaining the main conduit closed under normal pressures, the effect of such pressures upon the closed valve being to cause a resistance to movement, and automatic means for opening the valve upon a definite increase in the pressure.

3. The combination with a main conduit, of a by-pass conduit opening therefrom through which uninterrupted circulation may occur, a meter in the by-pass conduit operable at all times under flow through the system, a valve normally closing the main conduit between the openings of the by-pass conduit, and automatic means for opening the valve when the flow through the by-pass exceeds the amount properly conveyable thereby and then maintaining a definite rate of flow through said by-pass.

4. The combination with a main conduit, of a by-pass conduit opening therefrom through which uninterrupted circulation may occur, a meter in the by-pass conduit, a valve normally closing the main conduit between the openings of the by-pass conduit, a head connected with the valve, a chamber in which the head operates, and conduits leading from the chamber to the main conduit at each side of the valve.

5. The combination with a conduit system for conveying fluid under pressure, of a meter, a gate-valve normally closed during the flow of fluid through the system, means for supplying fluid to both sides of the closed valve, actuating mechanism for the valve, and conduits leading from the actuating mechanism to the main conduit at each side of the valve.

6. The combination with a main conduit, of a by-pass conduit opening therefrom, a meter in the system between the openings of said by-pass conduit, a valve operating in the system between the openings of the by-pass conduit and provided with a stem, a piston carried by the valve-stem, a cylinder coöperating with the piston, and pipes connecting the cylinder and conduit at each side of the valve.

7. The combination with a main conduit, of a by-pass opening therefrom, a meter of suitable capacity in the by-pass through which uninterrupted flow may occur, a valve in the conduit situated at all times between the openings of the by-pass, actuating mechanism connected with the valve, and conduits leading from the actuating mechanism to the main conduit at each side of the valve.

8. The combination with a main conduit, of a by-pass opening therefrom, a meter of suitable capacity in the by-pass, a meter of greater capacity and a valve in the conduit between the openings of the by-pass, actuating mechanism connected with the valve, and conduits leading from the actuating mechanism to the main conduit at each side of the valve.

Signed at Boston, in the county of Suffolk and State of Massachusetts, this 10th day of April, 1903.

JAMES A. TILDEN.

Witnesses:
FRANCIS C. HERSEY, Jr.,
FRANCIS C. HERSEY.